3,684,476
PROCESS FOR PRODUCTION OF N, Mg AND Ca
FERTILIZER
Bengt Wadsted, Copenhagen, Denmark, assignor to
Marden Anstalt
No Drawing. Filed Oct. 28, 1970, Ser. No. 84,939
Claims priority, application Sweden, Nov. 3, 1969,
15,039/69
Int. Cl. C05c 9/00
U.S. Cl. 71—28                     6 Claims

ABSTRACT OF THE DISCLOSURE

A synthetic N, Mg and Ca fertilizer containing nitrogen in the form of urea which is non-hygroscopic and can be mixed, stored and sown together with the seed, is produced in the following manner: Urea is reacted with a material which contains calcium carbonate and magnesium oxide in the proportion of 1–5 mol of $CaCO_3$ per mol of MgO.

Process for production of N, Mg and Ca fertilizer

The present invention relates to a process for the manufacture of N-, Mg- and Ca-fertilizer mainly for cereals such as wheat, rye, barley, maize and oats. One of the main objects of the invention is to economically produce a fertilizer in granular form with such properties that it can be mixed, stored and sown together with the seed. The fertilizer according to the present invention contains its nitrogen in the form of urea.

The urea used as fertilizer is mostly prilled, whereby 95% by weight of the product consists of prills or granules between 3 and 1 mm.: In order to counteract the hygroscopicity of the urea and prevent baking in storage this prilled urea is often conditioned with an inert material such as calcium carbonate or calcium sulphate. This conditioning does not suffice for rendering the urea suitable for mixing and storing together with the seed, the cover obtained by this method being much too loose. It has even been suggested to give the urea prills or "spheroidized" urea a cover of sulphur and polysulphides. By this method the nitrogen is absorbed relatively slowly thus reducing the risk of losses from heavy rainfall (leaching) and gas losses.

Fertilizers of this kind all suffer from the disadvantage that they are too expensive, so expensive in fact that they cannot be used commercialy for cereals. This particular fertilizer has the additional disadvantage that the sulphur in the cover increases the equivalent acidity from 36 lbs. $CaCO_3$/unit N to 64–56 lbs. $CaCO_3$/unit N.

Another slow release urea fertilizer is "Ureaform," which is obtained from formaldehyde and urea. By this reaction a number of complexes of metylen carbamide are formed, some of which are but slightly soluble in water. These "Ureaform" products can probably be mixed, stored and sown with the seed, but the price is prohibitive for cereals. Their use is limited to gardening and golf courses, where the price of the fertilizer is of secondary importance.

These disadvantages are overcome with the present invention, whereby a fertilizer is obtained with satisfactory properties and most satisfactory from an economical viewpoint. The chief characteristic feature of the process consists in bringing urea to react upon a material containing calcium carbonate and magnesium amide material in the proportion 1–5 mol $CaCO_3$ per mol MgO. After completion of the reaction the product is dried, if necessary.

The most suitable material for this reaction is selectively calcined dolomite $CaCO_3 \cdot MgO$ or selectively calcined dolomitic limestone with 1–5 $CaCO_3$ per mol MgO.

The urea and the selectively calcined dolomite are brought into reaction in the solid phase. It is desirable that the two products are as dry as possible. The reaction between the MgO, which is selectively calcined dolomite is highly reactive, consists in the formation of a layer of magnesium dicarbamide and to a lesser extent magnesium carbamide on the urea crystals or prills according to the reaction:

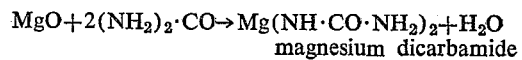
magnesium dicarbamide and to a lesser extent

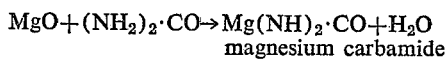
magnesium carbamide

Magnesium carbamide and magnesium dicarbamide are both fairly easily decomposed in the soil forming various magnesium carbonates and urea with the moisture and $CO_2$ in the soil.

The layer of magnesium carbamides is quite sticky particularly at higher temperature and the $CaCO_3$ in the selectively calcined dolomite is readily attached to this layer forming a solid protective layer.

The reaction is a condensation process in the solid phase. The water is formed from the oxygen atom in the MgO and the hydrogen atoms in the urea.

It is essential that the $H_2O$ is eliminated in order to prevent the formation of $Mg(OH)_2$ which as any other base can drive off $NH_3$ from the urea.

While the reaction will take place in a dry room at room temperature it is preferably carried out at at least 50° C.; heating to 100–130° C., especially 120–130° C., is most suitable. Broadly, therefore, a preferred embodiment of the invention may be said to consist in effecting the aforesaid reaction at a temperature of about 50–130° C.

The product thus obtained is non-hygroscopic and can be mixed, stored and sown with the seed. It constitutes a N, Mg and Ca-fertilizer, containing these elements in the form of urea, magnesium urea complexes, basic magnesium carbonate, calcium carbonate and calcium magnesium carbonate.

The two raw materials are brought to react in the form of granules or powder. The size of the granules should as a rule not exceed 5 mm. The normal urea prills 1–3 mm. or even 2–4 mm. would be very suitable. The particle size of the selectively calcined dolomite or dolomitic limestone can preferably be 1–0.05 mm. The proportion by weight between urea and MgO in the raw materials should be such that that the finished product has a magnesium content of 7% to 0.25%, preferably between 4.5% and 0.5% MgO. As stated above the reaction according to a preferred method takes place in a temperature interval of 120–130° C. In this interval the time of reaction is from 5–60 minutes, preferably 20–30 minutes.

The raw material, selectively calcined dolomite or selectively calcined dolomitic limestone can be obtained by various known methods in a kiln or fluidized bed at temperatures between 700 and 800° C. The lower the calcining temperature and the quicker the calcined product is used the faster and more complete will the formation of magnesium urea complexes take place.

Practical tests have shown that ordinary urea prills, 1–3 mm. diameter, can without difficulties be brought to almost complete reaction with freshly selectively calcined dolomite (or dolomitic limestone) in a granulator with external heating at an internal temperature of 120–130° C. On the surface of the urea, magnesium urea complexes are formed, which simultaneously bind the $CaCO_3$ around the urea prills in a most stable cover.

A similar effect can be obtained if instead of selectively calcined dolomitic limestone a mixture of selectively calcined dolomite and highly dessiminated $CaCO_3$ for instance chalk is used. The cover around the urea prills is, however, somewhat less stable.

The process according to the invention is thus quite simple. The raw material, particularly if dolomitic limestone, which otherwise has no market, is very cheap. Furthermore the Mg-content is citrate soluble and thus available to the plant, which increases the value of the finished product.

The invention is further illustrated in the following examples, but the invention is not limited to the specific embodiments therein described, as many apparently different embodiments of the present invention can be made without departing from the spirit and scope of the invention.

All percentages in the following examples are percentages by weight.

EXAMPLE I 62 g. of prilled urea of the ordinary specification, 95% between 3 and 1 mm. prills, nitrogen content 45%, thus with a content of 1 gram-mol urea was treated in an externally heated granulator at a temperature between 120–130° C. in 30 minutes with 14 g. of ground selectively calcined Norwegian dolomite with a content of 25.2% MgO.

The finished granulated product weighed 75 g. and showed a content of 4.4% MgO citrate soluble and 37% N. This granulated product, which had a particle size of 2–4 mm., has been stored for 2 months together with 45 g. of wheat without any baking or any detriment to the wheat.

EXAMPLE II

As in Example I 62 g. urea was treated with 10 g. of ground selectively calcined dolomitic limestone, having a content of 16.5% MgO corresponding to approximately 1 mol MgO to 2 mol $CaCO_3$. The finished granular product, 2–4 mm., weighed 71 g. after drying. The citrate soluble MgO content was 2.25% and 39.4% N.

The product has been stored for 2 months with 45 g. wheat as in Example I with the same good result.

EXAMPLE III

As in Examples I and II 62 g. of urea was treated with a mixture of 4 g. of the same finely ground selectively calcined Norwegian dolomite containing 25.2% MgO and 11 g. of chalk containing 98% $CaCO_3$. This mixture corresponds approximately to 4 mol $CaCO_3$ per 1 mol MgO. The finished product showed an analysis of 1.28% citrate soluble MgO and 38.2% N.

The product has been stored with 45 g. wheat as in Examples I and II. While the cover gives off some $CaCO_3$ dust because the binding of $CaCO_3$ is not the same as in Examples I and II, it still appears that the properties of the fertilizer are satisfactory for the purpose.

The fertilizer described can be mixed with fertilizers containing P, K and trace elements. Particular reference is made to fertilizers obtained by mixing this fertilizer with P, K, Mg, Ca-fertilizer according to Swedish Pat. No. 310,370. Hereby a complete fertilizer is obtained, which can be stored and sown together with the seed and by which all the needs of the plant for N, P, K, Mg and CaO can be covered in one operation once a year.

I claim:

1. A process for producing a synthetic N, Mg and Ca fertilizer containing nitrogen in the form of urea, comprising the step of reacting solid particulate urea in the absence of added water with a solid particulate dolomitic material selected from the group consisting of selectively calcined dolomite, $CaCO_3 \cdot MgO$, and selectively calcined dolomitic limestone, $1\text{–}5CaCO_3 \cdot 1MgO$, to thereby coat the solid urea particles with a coating of magnesium dicarbamide and magnesium carbamide upon which the $CaCO_3$ is deposited to thus form a solid layer, said dolomitic material having been calcined at a temperature within the range of 700° C. to 800° C.

2. A process according to claim 1 in which the resultant product is dried.

3. A process according to claim 1 in which the reaction is carried out at 50–130° C.

4. A process according to claim 1 in which the reaction is carried out at 100–130° C.

5. A process according to claim 1 in which the reaction is carried out at 120°–130° C.

6. A synthetic N, Mg and Ca fertilizer comprising solid urea particles having a coating of magnesium dicarbamide and magnesium carbamide upon which $CaCO_3$ is deposited to thus form a solid layer, said coating having been obtained by reaction of the urea particles with a solid particulate dolomitic material selected from the group consisting of selectively calcined dolomite, $CaCO_3 \cdot MgO$, and selectively calcined dolomitic limestone, $$1\text{–}5\ CaCO_3 \cdot 1MgO$$

said dolomitic material having been calcined at a temperature within the range of 700° C. to 800° C.

References Cited

UNITED STATES PATENTS

| | | | |
|---|---|---|---|
| 3,533,776 | 10/1970 | Coates et al. | 71—64 DB X |
| 3,137,565 | 6/1964 | Hayes | 71—64 E |
| 3,282,674 | 11/1966 | Mohr et al. | 71—64 DB |
| 3,592,625 | 7/1971 | Burkheut et al. | 71—64 DB |
| 3,025,571 | 3/1962 | Beecher et al. | 71—64 DB X |
| 3,539,326 | 11/1970 | Otsuka et al. | 71—64 DB X |
| 3,291,594 | 12/1966 | Nickerson | 71—63 X |
| 3,214,261 | 10/1965 | Galloway | 71—63 X |
| 3,186,825 | 6/1965 | Price | 71—63 X |
| 2,193,842 | 3/1940 | Rex | 71—63 X |

REUBEN FRIEDMAN, Primary Examiner

R. BARNES, Assistant Examiner

U.S. Cl. X.R.

71—64 E; 260—555 C